United States Patent
Sadri et al.

[19]

[11] Patent Number: 5,974,130
[45] Date of Patent: Oct. 26, 1999

[54] TRANSPARENT CALL DISCRIMINATION (TCD) METHOD AND APPARATUS

[75] Inventors: Ali Sadri, Cary, N.C.; Parviz Yegani, San Diego, Calif.

[73] Assignee: International Business Machines Corporation, Armonk, N.Y.

[21] Appl. No.: 08/935,740

[22] Filed: Sep. 23, 1997

[51] Int. Cl.$^6$ .............. H04M 1/64; H04M 1/56; H04M 3/42; H04L 12/28

[52] U.S. Cl. ............ 379/210; 379/88.13; 379/88.21; 379/93.11; 379/93.15; 379/100.08; 379/142; 379/215; 379/902; 370/257

[58] Field of Search ............... 379/229, 201, 379/210, 211, 215, 142, 88.13, 93.09, 93.24, 93.35, 902, 88.21, 93.11, 93.15, 100.08, 100.01; 370/257, 363, 385

[56] References Cited

U.S. PATENT DOCUMENTS

| | | | |
|---|---|---|---|
| 4,582,956 | 4/1986 | Doughty | 179/2 A |
| 5,054,055 | 10/1991 | Hanle et al. | 379/142 |
| 5,117,452 | 5/1992 | Callele et al. | 379/98 |
| 5,193,110 | 3/1993 | Jones et al. | 379/94 |
| 5,228,080 | 7/1993 | Nutter et al. | 379/373 |
| 5,361,296 | 11/1994 | Reyes et al. | 379/96 |
| 5,377,260 | 12/1994 | Long | 379/95 |
| 5,396,548 | 3/1995 | Bayerl et al. | 379/140 |
| 5,412,709 | 5/1995 | Jarvis et al. | 379/28 |
| 5,517,557 | 5/1996 | Tanaka | 379/67 |
| 5,544,235 | 8/1996 | Ardon | 379/177 |
| 5,546,448 | 8/1996 | Caswell et al. | 379/142 |
| 5,692,039 | 11/1997 | Brankley et al. | 379/229 |
| 5,841,854 | 11/1998 | Schumacher et al. | 379/265 |

FOREIGN PATENT DOCUMENTS

| | | |
|---|---|---|
| 2-248149 | 10/1990 | Japan . |
| 4-144594 | 4/1992 | Japan . |

*Primary Examiner*—Krista Zele
*Assistant Examiner*—Benny Q. Tieu
*Attorney, Agent, or Firm*—Kenneth A. Seaman

[57] ABSTRACT

A method of transparent call discrimination includes providing a call discrimination data message within a Caller ID message frame structure of an outgoing call from a call originating equipment. A type of call on an incoming telephone line of a call receiving equipment is discriminated in response to the call discrimination message, wherein the type of call is discriminated prior to an occurrence of an OFF-HOOK state of the telephone line. An appropriate device of the call receiving equipment is then activated in response to the type of call, in preparation for responding to the incoming call. Lastly, the incoming call is routed to the appropriate device in response to the discriminated type of call at the occurrence of the OFF-HOOK state. An apparatus for transparent call discrimination is also disclosed.

20 Claims, 4 Drawing Sheets

TRANSPARENT CALL DISCRIMINATION (TCD) METHOD AND APPARATUS

BACKGROUND OF THE INVENTION

1. Field of the Invention

This invention relates generally to a method and apparatus for digital signal processing communications and, more particularly, to a transparent call discrimination technique using a caller ID frame structure.

2. Discussion of the Related Art

In the current state of the art, a call discrimination function for telephone communication applications using Customer Premises Equipment (CPE) is done during an OFF-HOOK period. CPE may include, for example, a telephone, fax machine, modem, etc . . . In view of the call discrimination being done during the OFF-HOOK period, the discriminating task is thus activated only when the phone goes OFF-HOOK. After discriminating for the type of call, an appropriate device sends a message to a corresponding driver of the device. The corresponding driver then loads an appropriate task and responds to the incoming call. Depending on the specific CPE, this process could take several seconds.

Many standard telephone carriers are encoding Caller ID information with communication signals in which the Caller ID information is received before call answering (e.g., with a telephone). Caller ID includes a physical layer signaling of a Caller ID standard, however, call discrimination using Caller ID information has not heretofore been addressed.

SUMMARY OF THE INVENTION

It is an object of the present invention to make transparent a call discrimination function and reduce an amount of time required for providing a response by a CPE to an incoming call.

Another object of the present invention is to provide a method for including information on the type of call being placed over a public telephone network in the Caller ID interval to allow the receiving station to transparently determine which type of call is being received before going OFF-HOOK and answering.

In accordance with the present invention a method of transparent call discrimination includes providing a call discrimination data message within a Caller ID message frame structure of an outgoing call from a call originating equipment. A type of call on an incoming telephone line of a call receiving equipment is discriminated in response to the call discrimination message, wherein the type of call is discriminated prior to an occurrence of an OFF-HOOK state of the telephone line. An appropriate device of the call receiving equipment is then activated in response to the type of call, in preparation for responding to the incoming call. Lastly, the incoming call is routed to the appropriate device in response to the discriminated type of call at the occurrence of the OFF-HOOK state. An apparatus for transparent call discrimination is also disclosed.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
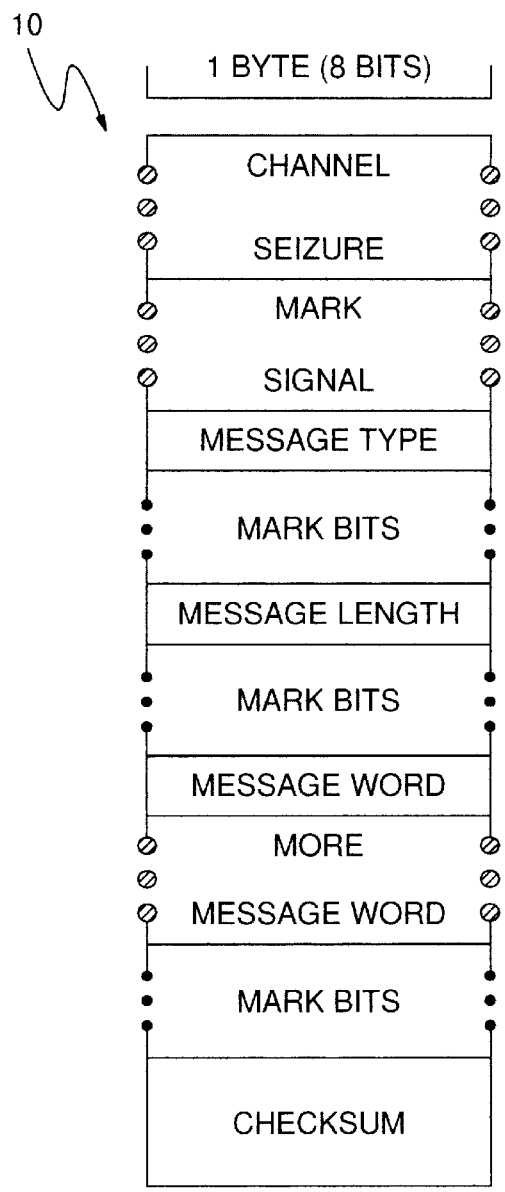
FIG. 1 illustrates a caller ID single data message frame format according to one embodiment of the present invention.
Figure 2:
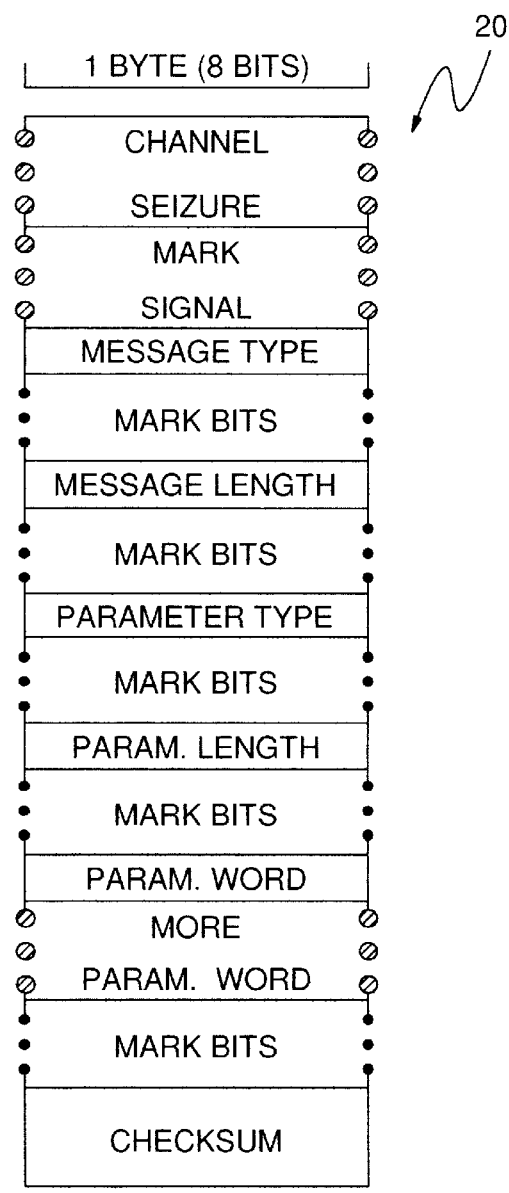
FIG. 2 illustrates a caller ID multiple data message frame format according to an alternate embodiment of the present invention.

Turning now to FIGS. 1 and 2, in accordance with the present invention, a novel method of transparent call discrimination (TCD) includes the use of a caller ID frame structure. In FIG. 1, a single data message frame format 10 is used for transmitting caller ID information in a single-message format. The single data message frame format 10 is characterized by a channel seizure frame, a mark signal frame, a message type frame, a first mark bits frame, a message length frame, a second mark bits frame, a message word frame, a more message word frame, a third mark bits frame, and a checksum frame. In accordance with the present invention, an appropriate data and/or message for use in a call discrimination function is placed within the Caller ID information of the single data message frame format 10. The particular type of data for use in a call discrimination function is known in the art and thus not further discussed herein.

In FIG. 2, a multiple data message frame format 20 is used for transmitting caller ID information in a multiple data message format. The multiple data message frame format 20 is characterized by a channel seizure frame, a mark signal frame, a message type frame, a first mark bits frame, a message length frame, a second mark bits frame, a parameter type frame, a third mark bits frame, a parameter length frame, a fourth mark bits frame, a parameter word frame, a more parameter word frame, a fifth mark bits frame, and a checksum frame. In accordance with an alternate embodiment of the present invention, an appropriate data and/or message for use in a call discrimination function is placed within the Caller ID information of the multiple data message frame format.

Figure 3:
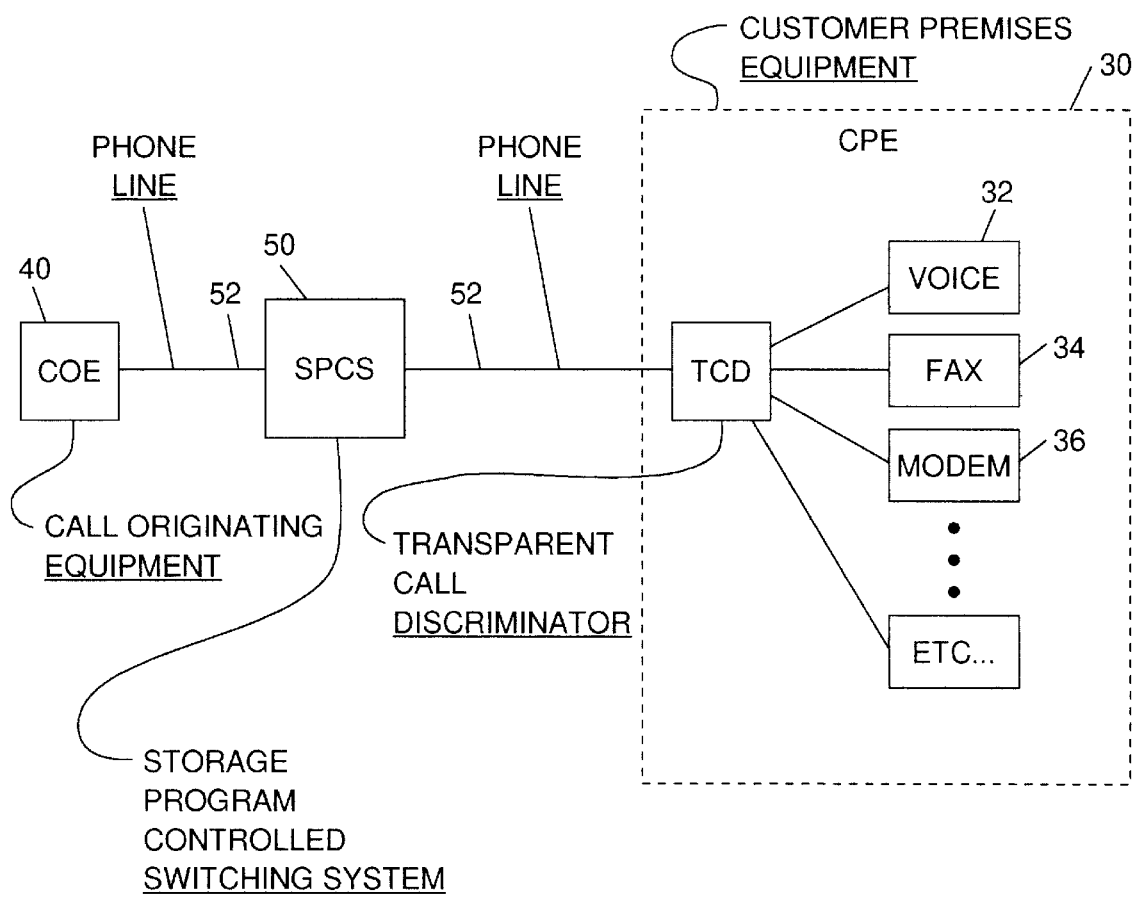
FIG. 3 illustrates a DSP communications system employing the transparent call discrimination method and apparatus according to the present invention.

With reference to FIG. 3, the method according to the present invention allows a Customer Premises Equipment (CPE) 30 (alternatively referred to as call receiving equipment) to identify a type of call being received. CPE 30 includes, for example, a telephone 32, a fax machine 34, modem 36, etc. CPE 30 further includes voice transparent call discriminator 38. In one embodiment, the CPE includes a digital signal processor (DSP) board, the DSP board including a multifunction adapter card which is controlled by a digital signal processor. The adapter card is capable of handling and performing voice, fax, and modem functions, with the DSP having been programmed with suitable microcode for performing the desired function and/or functions. The type of call may include, for example, voice, fax, modem, etc. The method according to the present invention further includes the step of enabling an incoming call from call originating equipment 40 to be routed to an appropriate device, depending upon the type of call. Since caller ID information is transmitted during both ON-HOOK and OFF-HOOK periods, the transparent call discrimination method according to the present invention advantageously saves a few seconds of detection time during both the ON-HOOK and the OFF-HOOK periods as discussed herein. In addition, to take advantage of the present invention, a Storage Program Controlled Switching System (SPCS) 50 of a telephone carrier is suitably programmed using programming techniques known in the art and set-up to a caller ID service which incorporates call discrimination data and/or messages within the caller ID message frame format. Appropriate communication lines (e.g., phone lines) 52 interconnect the devices of the DSP communications system of FIG. 3.

The transparent call discrimination (TCD) method according to the present invention is applicable for use in any office environment in which one phone line is available for activating multiple applications. Such multiple applications may include, for example, voice, fax, and modem. Provided that a caller ID service is available and that the SPCS is set up to support the transparent call discrimination method according to the present invention using the frame format as discussed herein above and shown in FIGS. 1 and 2, a TCD device 38 can determine the type of incoming call prior to an occurrence of an OFF-HOOK state (i.e., determining of the call type during an ON-HOOK state). This flexibility allows the appropriate device to be initialized or loaded during the ringing period. Consequently, the present invention thus allows more time to activate tasks and drivers of the appropriate device in preparation for responding to an incoming call during the OFF-HOOK state.

In accordance with the present invention, a call type is inserted within Caller ID information by the call originating equipment. For example, with a fax call type, the call originating equipment may insert the code "*FAX" into the Caller ID information string prior to the call being established. Alternatively, a specific call type may be established using standard serial port AT command sets, as are known in the art. For example, if dialing through a modem, a call type could be appended to the Caller ID information, such as, "*MODM". The call type can be appended to the destination number by the originating modem. Still further, the Caller ID information can be reconfigured as appropriate by the call originating equipment, which then inserts an appropriate call type data into the Caller ID information.

In addition, a priority type may also be added to the particular call type information included within the Caller ID frame format. That is, if a call has a priority type "urgent", then the call type can be identified with an appropriate code representative of call type urgent, similarly as with respect to appropriate codes representative of call types fax, modem, and voice. If an urgent type call is received during an occurrence of a voice call, for example, the CPE can respond appropriately by interrupting the present voice call and proceeding with a processing of the urgent type call. In the latter example, it is assumed that the voice call is of a lower priority than the urgent type call. In addition, the latter is applicable for use during Caller ID on call waiting as will be further discussed herein below.

Figure 4:
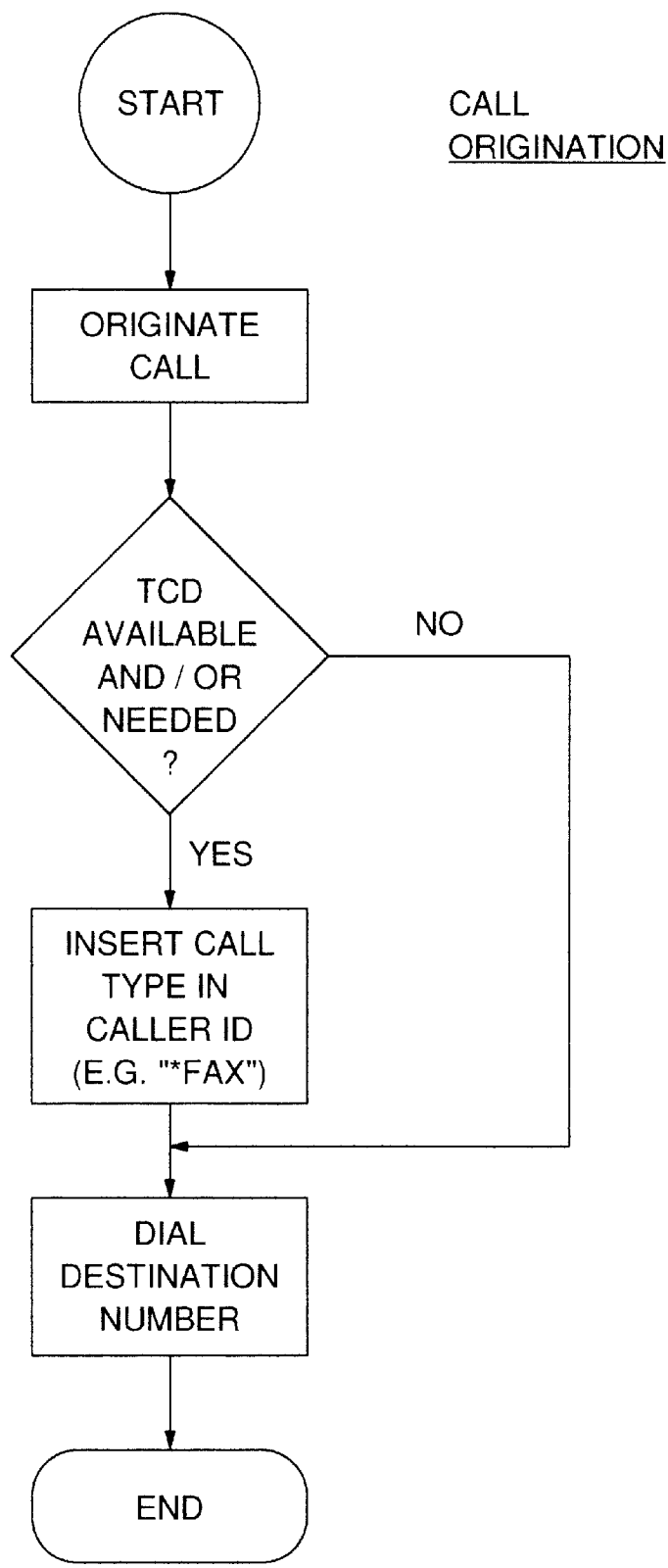
FIG. 4 is a flow diagram which illustrates the transparent call discrimination method according to the present invention with respect to call origination.
Figure 5:
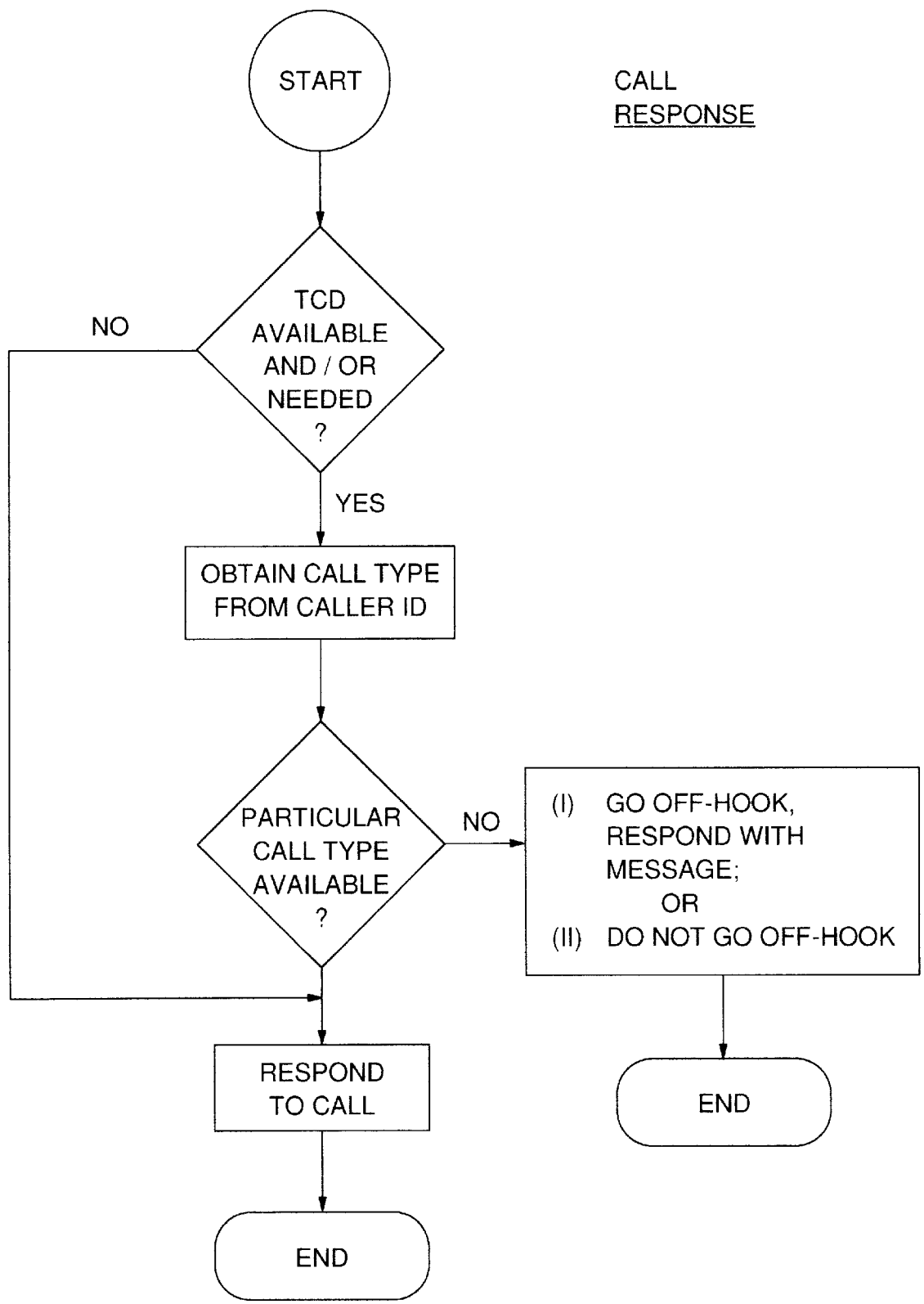
FIG. 5 is a flow diagram which illustrates the transparent call discrimination method according to the present invention with respect to call response.

Referring now to FIGS. 4 and 5, flow diagrams are shown which illustrate the transparent call discrimination method according to the present invention with respect to call origination and call response, respectively. In FIG. 4, call origination equipment begins by initiating a call. In the next step, an inquiry is made as to whether or not TCD is available and/or needed. If TCD is not available and/or not needed, then the COE dials the destination number and the call proceeds to the destination CPE. If TCD is available and/or needed, then the COE inserts the call type information into the Caller ID information. The COE then dials the destination number and the call proceeds to the destination CPE. Referring now to FIG. 5, at the destination CPE, a call response begins with an inquiry as to whether or not TCD is available and/or needed. If TCD is not available and/or not needed, then the destination CPE goes OFF-HOOK and responds to the call. On the other hand, if TCD is available and/or needed, then the destination CPE next obtains the call type from the Caller ID information. Once the call type has been obtained from the Caller ID information, the CPE then inquires whether or not the incoming call type is available at the destination CPE. If the incoming call type is not available, then the destination CPE can either (i) not answer (i.e., not go OFF-HOOK) or (ii) go OFF-HOOK and send a message back to the call origination equipment, e.g., play a recorded voice message back to the call origination equipment that indicates that the type of call being sent is not available at the destination equipment. If the incoming call type is available, then the destination CPE can initiate appropriate steps in preparation for responding to the incoming call, as discussed herein above, and respond to the call.

In another application of the present invention, the TCD method can be utilized during a Call Waiting period. In this case, if Caller ID is available during a Call Waiting period, the TCD device can determine, in advance, the priority and the type of call of a third party. The TCD device can thus prioritize calls as they arrive. If the third party is a fax and the fax call has a higher priority than a voice call of a second party, then the TCD device can put the second caller on hold until the third party's fax is received (i.e., completed). After the third party's fax is received, the TCD device can then flash back to the second caller. The TCD method and apparatus of the present invention provide a very unique and efficient method of discrimination for multi-tasking systems with limited processing power and program controlled resources.

In accordance with the present invention, the TCD method and apparatus are made to comply with the requirements for Voiceband Data Transmission Interface Generic Requirements per Bellcore standard document, TR-NWT-000030, Issue 2, October 1992, as is known in the art. The compliance also includes any necessary support for both SPCS and CPE manufacturers. By employing the TCD method and apparatus according to the present invention, it is now possible to determine the type of an incoming call prior to an OFF-HOOK state of a corresponding telephone line. As a result, all necessary tasks associated with the type of incoming call can be activated and the intended called function can be downloaded as appropriate in a time frame between a ring period. The present TCD method and apparatus thus saves the caller several seconds of toll, wherein ten (10) seconds is required for a typical call setup as is known in the art.

Call discrimination can be viewed as being very important for both small businesses and residential customers having one phone line available for activating multiple applications. The present invention thus provides advantages and features as discussed herein above.

While the invention has been particularly shown and described with reference to specific embodiments thereof, it will be understood by those skilled in the art that various changes in form and detail may be made thereto, and that other embodiments of the present invention beyond embodiments specifically described herein may be made or practice without depredating from the spirit and scope of the present invention as limited solely by the appended claims.

What is claimed is:

1. A method of transparent call discrimination comprising the steps of:

providing a call discrimination data message within a Caller ID message frame structure of an outgoing call from a call originating equipment, said Caller ID message frame structure having a single data message frame format, the single data message frame format characterized by a channel seizure frame, a mark signal frame, a message type frame, a first mark bits frame, a message length frame, a second mark bits frame, a message word frame, a more message word frame, a third mark bits frame, and a checksum frame;

discriminating a type of call on an incoming telephone line of a call receiving equipment in response to the call discrimination message, wherein the type of call is discriminated prior to an occurrence of an OFF-HOOK state of the telephone line;

activating an appropriate device of the call receiving equipment in response to the type of call in preparation for responding to the incoming call; and routing the incoming call to the appropriate device in response to the discriminated type of call at the occurrence of the OFF-HOOK state.

2. The method of claim 1, wherein the call receiving equipment includes telephone, fax, and modem devices for performing voice, facsimile, and modem applications, respectively.

3. The method of claim 1, wherein said step of activating the appropriate device includes activating tasks and drivers of the appropriate device in preparation for responding to the incoming call.

4. The method of claim 1, further including the step of:

discriminating a type of call for subsequent incoming calls received on the incoming telephone line during a call waiting period; and prioritizing incoming calls as they arrive.

5. The method of claim 1, further including the step of:

discriminating a type of call for a subsequent incoming call received on the incoming telephone line during a call waiting period;

prioritizing each incoming call in a priority order when received, the priority order including at least a low priority and a high priority; and placing an incoming call having a low priority on hold, while an incoming call having a high priority is allowed to be received.

6. A method of transparent call discrimination comprising the steps of:

providing a call discrimination data message within a Caller ID message frame structure of an outgoing call from a call originating equipment, said Caller ID message frame structure having a multiple data message frame format, the multiple data message frame format characterized by a channel seizure frame, a mark signal frame, a message type frame, a first mark bits frame, a message length frame, a second mark bits frame, a parameter type frame, a third mark bits frame, a parameter length frame, a fourth mark bits frame, a parameter word frame, a more parameter word frame, a fifth mark bits frame, and a checksum frame;

discriminating a type of call on an incoming telephone line of a call receiving equipment in response to the call discrimination message, wherein the type of call is discriminated prior to an occurrence of an OFF-HOOK state of the telephone line;

activating an appropriate device of the call receiving equipment in response to the type of call in preparation for responding to the incoming call; and routing the incoming call to the appropriate device in response to the discriminated type of call at the occurrence of the OFF-HOOK state.

7. The method of claim 6, wherein the call receiving equipment includes telephone, fax, and modem devices for performing voice, facsimile, and modem applications, respectively.

8. The method of claim 6, wherein said step of activating the appropriate device includes activating tasks and drivers of the appropriate device in preparation for responding to the incoming call.

9. The method of claim 6, further including the step of:

discriminating a type of call for subsequent incoming calls received on the incoming telephone line during a call waiting period; and prioritizing incoming calls as they arrive.

10. The method of claim 6, further including the step of:

discriminating a type of call for a subsequent incoming call received on the incoming telephone line during a call waiting period;

prioritizing each incoming call in a priority order when received, the priority order including at least a low priority and a high priority; and placing an incoming call having a low priority on hold, while an incoming call having a high priority is allowed to be received.

11. A communication system having transparent call discrimination comprising:

means for providing a call discrimination data message within a Caller ID message frame structure of an outgoing call from a call originating equipment, said Caller ID message frame structure having a single data message frame format, the single data message frame format characterized by a channel seizure frame, a mark signal frame, a message type frame, a first mark bits frame, a message length frame, a second mark bits frame, a message word frame, a more message word frame, a third mark bits frame, and a checksum frame;

means for discriminating a type of call on an incoming telephone line of a call receiving equipment in response to the call discrimination message, wherein the type of call is discriminated prior to an occurrence of an OFF-HOOK state of the telephone line;

means for activating an appropriate device of the call receiving equipment in response to the type of call in preparation for responding to the incoming call; and means for routing the incoming call to the appropriate device in response to the discriminated type of call at the occurrence of the OFF-HOOK state.

12. The communication system of claim 11, wherein the call receiving equipment includes telephone, fax, and modem devices for performing voice, facsimile, and modem applications, respectively.

13. The communication system of claim 11, wherein said activation means includes means for activating tasks and drivers of the appropriate device in preparation for responding to the incoming call.

14. The communication system of claim 11, wherein said discrimination means is further for discriminating a type of call for subsequent incoming calls received on the incoming telephone line during a call waiting period, said communication system further comprising:

means for prioritizing incoming calls as they arrive.

15. The communication system of claim 11, wherein said discrimination means is further for discriminating a type of call for a subsequent incoming call received on the incoming telephone line during a call waiting period, said communication system further comprising:
   means for prioritizing each incoming call in a priority order when received, the priority order including at least a low priority and a high priority; and
   means for placing an incoming call having a low priority on hold, while an incoming call having a high priority is allowed to be received.

16. A communication system having transparent call discrimination comprising:
   means for providing a call discrimination data message within a Caller ID message frame structure of an outgoing call from a call originating equipment, said Caller ID message frame structure having a multiple data message frame format, the multiple data message frame format characterized by a channel seizure frame, a mark signal frame, a message type frame, a first mark bits frame, a message length frame, a second mark bits frame, a parameter type frame, a third mark bits frame, a parameter length frame, a fourth mark bits frame, a parameter word frame, a more parameter word frame, a fifth mark bits frame, and a checksum frame;
   means for discriminating a type of call on an incoming telephone line of a call receiving equipment in response to the call discrimination message, wherein the type of call is discriminated prior to an occurrence of an OFF-HOOK state of the telephone line;
   means for activating an appropriate device of the call receiving equipment in response to the type of call in preparation for responding to the incoming call; and
   means for routing the incoming call to the appropriate device in response to the discriminated type of call at the occurrence of the OFF-HOOK state.

17. The communication system of claim 16, wherein the call receiving equipment includes telephone, fax, and modem devices for performing voice, facsimile, and modem applications, respectively.

18. The communication system of claim 16, wherein said activation means includes means for activating tasks and drivers of the appropriate device in preparation for responding to the incoming call.

19. The communication system of claim 16, wherein said discrimination means is further for discriminating a type of call for subsequent incoming calls received on the incoming telephone line during a call waiting period, said communication system further comprising:
   means for prioritizing incoming calls as they arrive.

20. The communication system of claim 16, wherein said discrimination means is further for discriminating a type of call for a subsequent incoming call received on the incoming telephone line during a call waiting period, said communication system further comprising:
   means for prioritizing each incoming call in a priority order when received, the priority order including at least a low priority and a high priority; and
   means for placing an incoming call having a low priority on hold, while an incoming call having a high priority is allowed to be received.

* * * * *